US012689943B2

(12) United States Patent (10) Patent No.: US 12,689,943 B2
Sasaki et al. (45) Date of Patent: Jul. 21, 2026

(54) COMMUNICATION CONTROL SYSTEM, COMMUNICATION CONTROL METHOD AND PROGRAM

(71) Applicant: NTT, Inc., Tokyo (JP)

(72) Inventors: Motoharu Sasaki, Tokyo (JP); Toshiro Nakahira, Tokyo (JP); Takatsune Moriyama, Tokyo (JP)

(73) Assignee: NTT, Inc., Tokyo (JP)

( * ) Notice: Subject to any disclaimer, the term of this patent is extended or adjusted under 35 U.S.C. 154(b) by 340 days.

(21) Appl. No.: 18/549,009

(22) PCT Filed: Apr. 14, 2021

(86) PCT No.: PCT/JP2021/015505
§ 371 (c)(1),
(2) Date: Sep. 5, 2023

(87) PCT Pub. No.: WO2022/219755
PCT Pub. Date: Oct. 20, 2022

(65) Prior Publication Data
US 2024/0155431 A1 May 9, 2024

(51) Int. Cl.
*H04W 28/08* (2023.01)
*H04B 17/373* (2015.01)
(Continued)

(52) U.S. Cl.
CPC ...... *H04W 28/0942* (2020.05); *H04B 17/373* (2015.01); *H04L 5/0048* (2013.01); *H04W 24/08* (2013.01)

(58) Field of Classification Search
CPC .......................... H04W 28/0942; H04W 24/08; H04B 17/373; H04L 5/0048
See application file for complete search history.

(56) References Cited

U.S. PATENT DOCUMENTS 8,395,994 B2 * 3/2013 Stevenson ............. H04L 65/752
370/468
8,971,964 B2 * 3/2015 Hosoya ................ H04B 7/0695
455/562.1
(Continued)

FOREIGN PATENT DOCUMENTS

JP        2018-006844      1/2018
WO      2015/133108      9/2015
WO      2020/202370      10/2020

OTHER PUBLICATIONS

Ryuichi Takechi et al, "Technology to Optimize Radio Access Networks: SON", Fujitsu. 62.4, P449-454, Jul. 2011, https://www.fujitsu.com/downloads/JP/archive/imgjp/jmag/vol62-4/paper15.pdf.
(Continued)

*Primary Examiner* — Redentor Pasia
(74) *Attorney, Agent, or Firm* — IPUSA, PLLC

(57) ABSTRACT

A communication control system includes a plurality of physical servers. One or more physical servers from among the plurality of physical servers each include a memory; and a processor configured to execute one or more steps of: acquiring information regarding a wireless communication device and environment information that affects wireless communication quality; predicting future wireless communication quality on a basis of the information regarding the wireless communication device and the environment information; controlling, on a basis of the future wireless communication quality, a target device to achieve wireless communication quality depending on a user's purpose, the user using wireless communication; and executing a combination of at least one or more steps of the acquiring, the predicting, or the controlling in response to a request from another system connected via a network.

11 Claims, 6 Drawing Sheets

(51) Int. Cl.
    *H04L 5/00*         (2006.01)
    *H04W 24/08*     (2009.01)

(56)            References Cited

U.S. PATENT DOCUMENTS

| | | | | |
|---|---|---|---|---|
| 11,736,343 | B2 * | 8/2023 | Matsuo | H04L 41/0876 |
| | | | | 709/224 |
| 2014/0341061 | A1 * | 11/2014 | Shinada | H04W 40/12 |
| | | | | 370/252 |
| 2015/0103685 | A1 | 4/2015 | Butchko et al. | |
| 2017/0019795 | A1 | 1/2017 | Takahashi | |
| 2017/0086121 | A1 * | 3/2017 | Kaushik | H04W 36/38 |
| 2017/0214598 | A1 * | 7/2017 | Kano | H04L 41/145 |
| 2020/0195359 | A1 * | 6/2020 | Singh | H04W 24/06 |
| 2020/0252147 | A1 * | 8/2020 | Jana | H04B 17/373 |
| 2022/0014288 | A1 * | 1/2022 | Matsunaga | H04W 4/44 |
| 2022/0014969 | A1 | 1/2022 | Matsunaga et al. | |
| 2022/0416921 | A1 * | 12/2022 | Zhao | G06N 3/08 |
| 2023/0308199 | A1 * | 9/2023 | Svennebring | H04B 17/3913 |

OTHER PUBLICATIONS

Office Action mailed on Oct. 1, 2025 with respect to the related U.S. Appl. No. 18/553,350.

* cited by examiner

Fig. 6

COMMUNICATION CONTROL SYSTEM, COMMUNICATION CONTROL METHOD AND PROGRAM

TECHNICAL FIELD

The present invention relates to a technology for dynamically controlling quality of wireless communication depending on a user's purpose of use.

BACKGROUND ART

In recent years, as the importance of social change through digitization increases, communication volume of smartphones and the like increases, and various things are connected to each other due to the development of the Internet of Things (IoT), and a role of wireless communication is remarkably enhanced in every scene of life. On the other hand, various wireless communication standards have appeared in accordance with diversified applications of wireless communication, and a wireless frequency band to be used is expanding from several 100 MHz to several 10 GHz, and it has become necessary to properly use radio waves in frequency bands having different characteristics and various wireless communication standards depending on situations. In such a complicated heterogeneous wireless communication environment, it appears ideal that an appropriate wireless communication standard can be used at any time with a natural sense of use without user's consciousness.

CITATION LIST

Patent Literature

Patent Literature 1: Technology to Optimize Radio Access Networks: Self-Organizing Network (SON), July 2011, https://www.fujitsu.com/downloads/JP/archive/imgjp/jmag/vol 62-4/paper15.pdf

SUMMARY OF INVENTION

Technical Problem

However, quality of wireless communication changes from moment to moment depending on situations, and the quality may not be stable due to an influence from a surrounding environment such as a user or a base station. For this reason, a technology for dynamically controlling the quality of wireless communication is required to enable the use of wireless communication with optimum quality depending on the user's purpose.

The present invention has been made in view of the above points, and an object of the present invention is to provide a technology for dynamically controlling the quality of wireless communication depending on the user's purpose of use.

Solution to Problem

According to the disclosed technology, there is provided a communication control system including a plurality of physical servers, in which any physical servers from among the plurality of physical servers each include any one or more of:

a plurality of acquisition units that acquires information regarding a wireless communication device and environment information that affects wireless communication quality;

a plurality of prediction units that predicts future wireless communication quality on the basis of the information regarding the wireless communication device and the environment information;

a plurality of control units that controls, on the basis of the future wireless communication quality, a target device to achieve wireless communication quality depending on a user's purpose, the user using wireless communication; and a cooperation unit that executes a combination of at least one or more of acquisition of information by the acquisition unit, prediction by the prediction unit, or control by the control unit in response to a request from another system connected via a network.

Advantageous Effects of Invention

According to the disclosed technology, it is possible to dynamically control the quality of wireless communication depending on the user's purpose of use.

BRIEF DESCRIPTION OF DRAWINGS

FIG. 6 is a diagram illustrating a hardware configuration example of a device.

DESCRIPTION OF EMBODIMENTS

Hereinafter, an embodiment (present embodiment) of the present invention will be described with reference to the drawings. The embodiment described below is merely an example, and an embodiment to which the present invention is applied is not limited to the embodiment below.

Overall Configuration Example of Communication Control System 10

Figure 1:
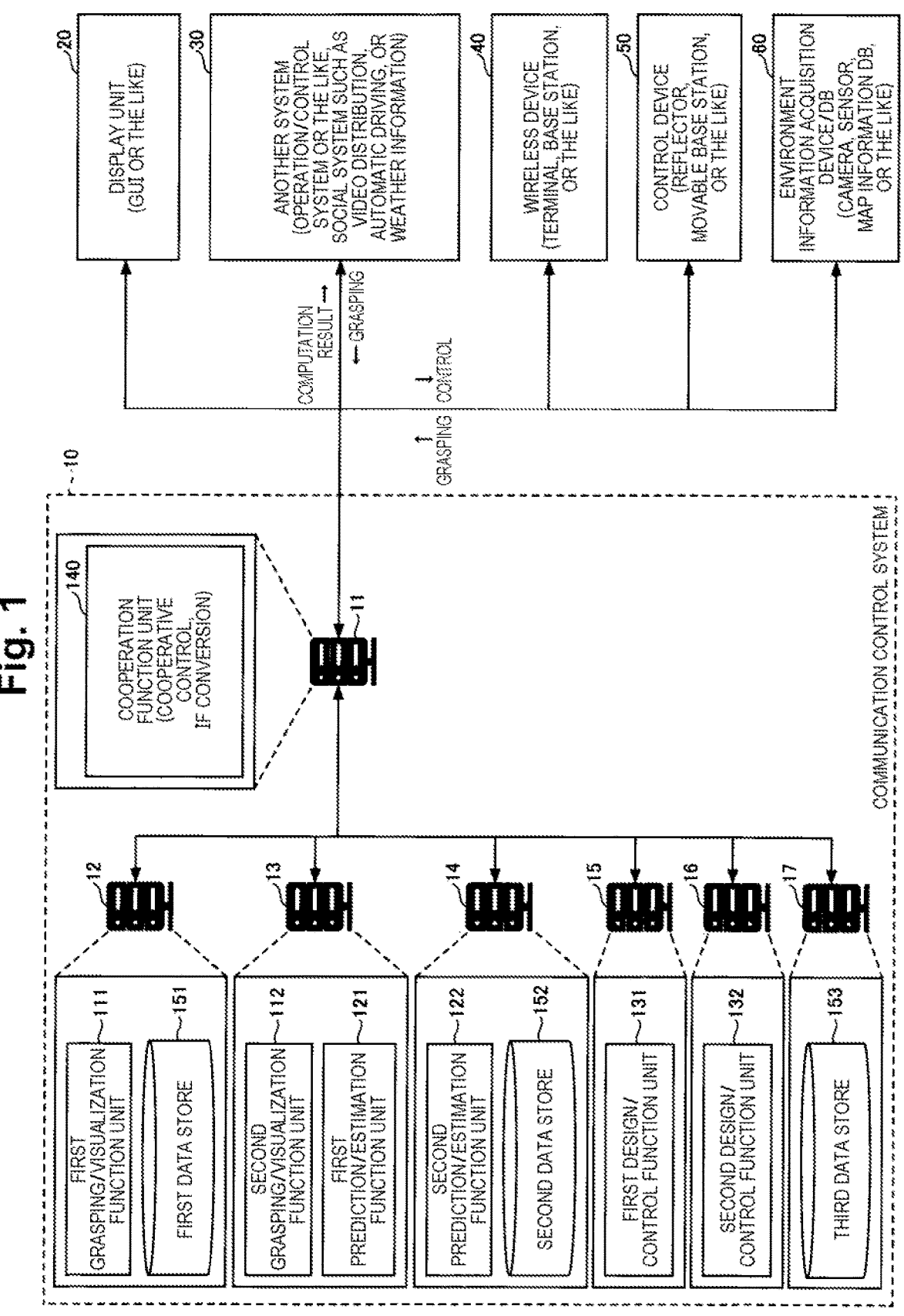
FIG. 1 is a diagram illustrating an overall configuration example of a communication control system according to a present embodiment.

FIG. 1 illustrates an overall configuration example of a communication control system 10 according to the present embodiment. As illustrated in FIG. 1, the communication control system 10 includes a plurality of physical servers 11 to 17, and includes a first grasping/visualization function unit 111 to a second grasping/visualization function unit 112, a first prediction/estimation function unit 121 to a second prediction/estimation function unit 122, a first design/control function unit 131 to a second design/control function unit 132, a cooperation function unit 140, and a first data store 151 to a third data store 153. Note that all or some of the physical servers 11 to 17 may be a physical server owned by a person who manages the communication control system 10 (that is, an on-premise type physical server), or may be a physical server that is a hardware resource provided in a form of a cloud service by a third party (that is, a cloud type physical server). In addition, the communication control system 10 may be referred to as a control system.

In the example illustrated in FIG. 1, a case is illustrated where the physical server 11 includes the cooperation function unit 140, the physical server 12 includes the first grasping/visualization function unit 111 and the first data store 151, the physical server 13 includes the second grasping/visualization function unit 112 and the first prediction/estimation function unit 121, the physical server 14 includes the second prediction/estimation function unit 122 and the second data store 152, the physical server 15 includes the first design/control function unit 131, the physical server 16 includes the second design/control function unit 132, and the physical server 17 includes the third data store 153.

However, this is an example, and the number of physical servers, the number of units other than the cooperation function unit 140, and the number of data stores are not limited to those described in this example. Hereinafter, in a case where the plurality of grasping/visualization function units such as the first grasping/visualization function unit 111 to the second grasping/visualization function unit 112 are not distinguished from each other, the grasping/visualization function units each are referred to as a "grasping/visualization function unit 110". Similarly, in a case where the plurality of prediction/estimation function units such as the first prediction/estimation function unit 121 to the second prediction/estimation function unit 122 are not distinguished from each other, the prediction/estimation function units each are referred to as a "prediction/estimation function unit 120". In a case where the plurality of design/control function units such as the first design/control function unit 131 to the second design/control function unit 132 are not distinguished from each other, the design/control function units each are referred to as a "design/control function unit 130". In addition, in a case where the plurality of data stores such as the first data store 151 to the third data store 153 are not distinguished from each other, the data stores each are referred to as a "data store group 150".

In addition, arrangement of each unit and each data store in the physical server is not fixed, and may be changed as appropriate depending on, for example, a lapse of time, a network situation between the physical servers, and the like. For example, in the example illustrated in FIG. 1, the first grasping/visualization function unit 111 is arranged on the physical server 12, but the first grasping/visualization function unit 111 may move to another physical server depending on the lapse of time, the network situation between the physical servers, and the like. The same applies to other units and data stores. Note that, to change the arrangement of each unit and each data store depending on the network situation between the physical servers, for example, a virtual network control technology or the like is used. Specifically, for example, a device or system functioning as an orchestrator that controls the arrangement of each unit and each data store on the physical server collects information regarding the network situation such as a communication delay between the physical servers, and dynamically controls the arrangement of each unit and each data store on the physical server on the basis of the information. Note that, as the device or system functioning as the orchestrator, a device or system present outside the communication control system 10 is assumed, but the present invention is not necessarily limited thereto, and for example, one or more physical servers constituting the communication control system 10 may function as the orchestrator.

The grasping/visualization function unit 110 acquires various types of information from a wireless device 40 (for example, a user terminal, a base station, or the like), an environment information acquisition device/DB 60 (for example, a camera, a sensor, a LiDAR/TOF, a DB that stores external data such as a map information DB, or the like), and a control device 50 (for example, a reflector, a movable base station, or the like). Note that, DB is an abbreviation for database. In addition, the grasping/visualization function unit 110 visualizes the acquired information on a display unit 20 (for example, a graphical user interface (GUI) or the like). Examples of the information acquired by the grasping/visualization function unit 110 include wireless information such as received power, object information detected by wireless sensing, video information captured by a camera, sensor information sensed by a sensor, installation state information on the reflector or the movable base station, and the like. Note that the grasping/visualization function unit 110 may be referred to as an acquisition unit.

A set of the wireless devices 40 described above constitutes a multi-wireless system. In the multi-wireless system, for example, a 3G-compatible base station provides a 3G wireless service, a 4G-compatible base station provides a 4G wireless service, a 5G-compatible base station provides a 5G wireless service, a 6G-compatible base station provides a 6G wireless service, and a wireless LAN base station provides a wireless LAN service. In addition, one base station may provide a plurality of wireless services from among 3G, 4G, 5G, 6G, and wireless LAN.

A user terminal in the multi-wireless system performs communication while switching a wireless system along with movement or depending on a situation of wireless quality. For example, when moving from an area of the 4G-compatible base station to an area of the 5G-compatible base station, the user terminal switches the wireless system from 4G to 5G and continues communication.

The communication control system 10 in the present embodiment can acquire information from each wireless device 40 constituting the multi-wireless system as described above, and can perform optimum wireless parameter setting for each wireless device 40.

In addition, map information stored in a map information DB that is an example of the environment information acquisition device/DB 60 may be high-definition three-dimensional map information expressing a shape of a structure, a type of a tree, and the like. By using such high-definition three-dimensional map information, it is possible to perform wireless network design in consideration of influence of propagation loss and shielding due to buildings, trees, and the like.

The prediction/estimation function unit 120 predicts or estimates a wireless parameter such as wireless quality (quality of wireless communication) on the basis of the information acquired by the grasping/visualization function unit 110. Note that the prediction/estimation function unit 120 may be referred to as a prediction unit.

The design/control function unit 130 performs derivation of an optimum wireless parameter, derivation of a design value for the control device 50 such as the reflector, control of the control device 50, and the like on the basis of the information acquired by the grasping/visualization function unit 110, the wireless parameter predicted or estimated by the prediction/estimation function unit 120, and the like. Note that the design/control function unit 130 may be referred to as a control unit.

In response to a request from another system 30 (for example, an operation/control system or the like, a social system or the like such as video distribution, automatic driving, or weather information), the cooperation function unit 140 appropriately combines and operate three function units of the grasping/visualization function unit 110, the prediction/estimation function unit 120, and the design/control function unit 130 depending on a situation (That is, the cooperation function unit 140 functions as an orchestrator that implements cooperative control of a plurality of function units.). In addition, at this time, the cooperation function unit 140 also performs IF conversion such as data type conversion as appropriate. The another system 30 can call the three function units by using an application programming interface (API). The cooperation function unit 140 may be referred to as a cooperation unit.

The cooperation function unit 140 can operate the grasping/visualization function unit 110, the prediction/estimation function unit 120, and the design/control function unit 130 to operate a cycle including acquisition of information by the grasping/visualization function unit 110, prediction of future wireless communication quality by the prediction/estimation function unit 120, and control on at least one of a target device or a target system by the design/control function unit 130. By periodically operating such a cycle, for example, it is possible to continue to configure a network to always satisfy communication quality necessary for a user. Note that the target device includes the wireless device 40, the environment information acquisition device/DB 60, the control device 50, and the like, and the target system includes a self-driving vehicle control system, a video system for control, a self-driving vehicle traveling system, and the like as described later. Note that, considering the "target device" broadly, the "target device" may include the wireless device 40, the environment information acquisition device/DB 60, the control device 50, and the like, and the self-driving vehicle control system, the video system for control, the self-driving vehicle traveling system, and the like.

That is, in a certain cycle, the grasping/visualization function unit 110 acquires a current wireless state, actual environment information, and the like implemented by the wireless device 40, the reflector 50, and the like designed and controlled by the design/control function unit 130 on the basis of the prediction of the future wireless communication quality. In the next cycle, when the prediction/estimation function unit 120 predicts that the future wireless communication quality deteriorates in a current setting state of the reflector 50 and the like, for example, on the basis of the current information, the design/control function unit 130 controls a radio wave reflection direction, radio wave reflection power, and the like by the reflector 50 so that the future wireless communication quality improves. Such a cycle is operated repeatedly, whereby it is possible to continue to configure the network to always satisfy the communication quality required by the user.

As the API, an API that calls an individual function unit among the three function units and an API that calls a scenario in which a plurality of function units is operated in cooperation are defined in advance. In a case where the scenario is called in which the plurality of function units is operated in cooperation, the cooperation function unit 140 calls the plurality of function units in a determined order by using the internal API in the communication control system 10 on the basis of the scenario, and returns a final output result to a caller of the scenario.

The API is disclosed to vendors and the like that develop the another system 30 and its application, and the like, and each vendor can develop a system or an application that implements various services by using the API.

The data store group 150 holds various data necessary for execution of the three function units of the grasping/visualization function unit 110, the prediction/estimation function unit 120, and the design/control function unit 130. The data store group 150 may be referred to as a data storage unit.

The communication control system 10 according to the present embodiment includes the above-described function units, and the grasping/visualization function unit 110, the prediction/estimation function unit 120, and the design/control function unit 130 operate in cooperation, whereby a wireless communication network is continuously configured to always satisfy the communication quality necessary for the user terminal. A wireless communication network that always satisfies the communication quality necessary for the user terminal is continuously configured by continuously operating a cycle of, for example, acquisition of various types of information by the grasping/visualization function unit 110, prediction or estimation of the wireless parameter by the prediction/estimation function unit 120, and control of the control device 50 by the design/control function unit 130. As a result, the user can use wireless communication with optimum quality depending on the user's purpose.

Hereinafter, Examples 1 to 4 will be described as examples of a technology according to the present embodiment. Note that Examples 1 to 4 can be implemented in combination as appropriate.

Operation Example in Example 1

Figure 2:
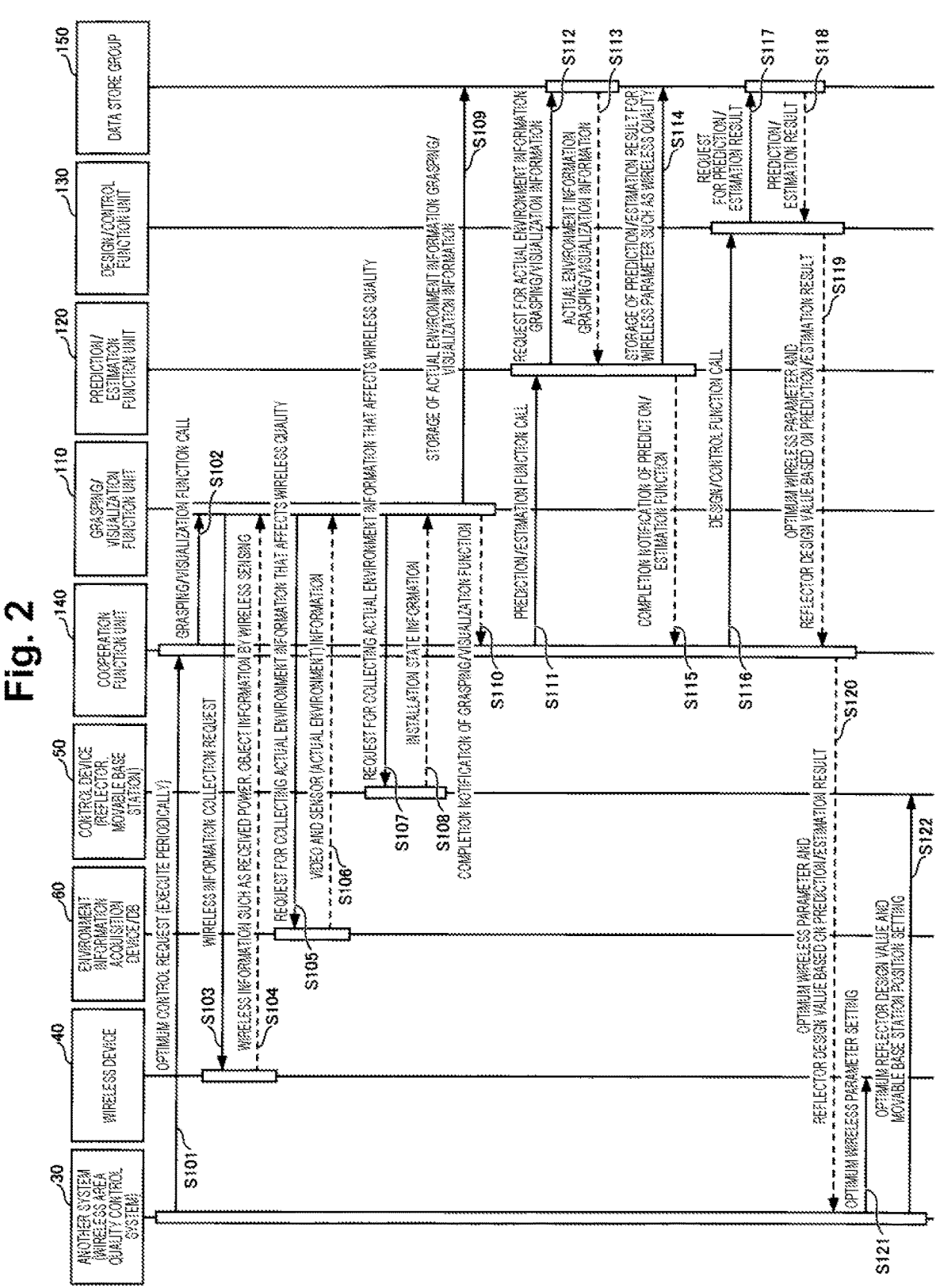
FIG. 2 is a sequence diagram for explaining an operation example in Example 1.

An operation example of the communication control system 10 in the present example will be described with reference to a sequence diagram of FIG. 2. In the present example, a case will be described where the communication control system 10 controls wireless area quality in response to a request from the another system 30, for optimum control of the wireless area quality. Note that, in the following description, it is assumed that the wireless device 40, the control device 50, and the environment information acquisition device/DB 60 are devices related to a wireless area as a target of the optimum control.

The cooperation function unit 140 receives an optimum control request from the another system 30 (for example, a wireless area quality system) (S101). Note that the optimum control request is periodically transmitted from the another system 30. In addition, the optimum control request is performed by using the API of the communication control system 10, whereby a scenario is called in which the optimum control of the wireless area quality is performed, and thereafter, the cooperation function unit 140 calls each function unit on the basis of the scenario.

The cooperation function unit 140 calls the grasping/visualization function unit 110 (S102). The grasping/visualization function unit 110 transmits a wireless information collection request to the wireless device 40 (S103). Then, the grasping/visualization function unit 110 acquires, as a response, wireless information such as received power of the wireless device 40 and object information detected by wireless sensing (that is, information on an object present around the wireless device 40) (S104).

Next, the grasping/visualization function unit 110 transmits a request for collecting actual environment information that affects the wireless quality to the environment information acquisition device/DB 60 (S105). Then, the grasping/visualization function unit 110 acquires, as a response, actual environment information (for example, video information captured by a camera, sensor information sensed by a sensor, map information, and the like) (S106).

Next, the grasping/visualization function unit 110 transmits a request for collecting actual environment information that affects the wireless quality to the control device 50 (S107). Then, the grasping/visualization function unit 110 acquires, as a response, installation state information (S108). Note that the installation state information is, for example, the movable base station or position information, an angle or a direction of the reflector, information such as the radio wave reflection direction or radio wave reflection power, or the like.

Next, the grasping/visualization function unit 110 stores the information (Hereinafter, it is referred to as "actual environment information grasping/visualization information".) acquired in the above-described S104, S106, and S108 in the data store group 150, and transmits a completion notification to the cooperation function unit 140 (S109 to S110).

Subsequently, the cooperation function unit 140 calls the prediction/estimation function unit 120 (S111). The prediction/estimation function unit 120 transmits a request for the actual environment information grasping/visualization information to the data store group 150 (S112). Then, the prediction/estimation function unit 120 acquires, as a response, the actual environment information grasping/visualization information (S113). Note that, regarding the actual environment information grasping/visualization information, not only the information stored in the above-described S109, but also the actual environment information grasping/visualization information in the past necessary for prediction or estimation of the wireless quality may be acquired.

Then, the prediction/estimation function unit 120 predicts or estimates a wireless parameter indicating future wireless quality or the like on the basis of the actual environment information grasping/visualization information acquired in the above-described S113, stores a result (Hereinafter, it is referred to as a "prediction/estimation result".) in the data store group 150, and transmits a completion notification to the cooperation function unit 140 (S114 to S115).

Note that the prediction or estimation of the wireless parameter is implemented by any predetermined method. For example, the wireless parameter only needs to be predicted or estimated by a machine learning model trained by a predetermined machine learning method. In addition, it is also possible to predict a propagation situation of a radio wave arriving at the wireless device 40 by a ray tracing method using actual environment information (high-definition three-dimensional map information or the like) and predict or estimate a wireless parameter on the basis of the propagation situation of the radio wave.

Subsequently, the cooperation function unit 140 calls the design/control function unit 130 (S116). The design/control function unit 130 transmits a request for the prediction/estimation result to the data store group 150 (S117). Then, the design/control function unit 130 acquires, as a response, the prediction/estimation result stored in the above-described S114 (S118). Thereafter, the design/control function unit 130 calculates an optimum wireless parameter and an optimum reflector design value on the basis of the acquired prediction/estimation result, and returns them to the another system 30 via the cooperation function unit 140 (S119 to S120). The optimum wireless parameter is, for example, a parameter for controlling the wireless device 40 to obtain wireless quality satisfying a predetermined standard (that is, a standard of the wireless quality necessary for the user terminal) in a case where the wireless quality indicated by the wireless parameter included in the prediction/estimation result is lower than the standard. Similarly, the optimum reflector design value is, for example, a design value for controlling the radio wave reflection direction, the radio wave reflection power, and the like of the reflector to obtain the wireless quality satisfying the predetermined standard in the case where the wireless quality indicated by the wireless parameter included in the prediction/estimation result is lower than the standard. Note that, in addition to these, for example, an optimum design value for controlling a position of the movable base station may also be calculated so that the wireless quality satisfies the standard.

Next, the another system 30 sets the optimum wireless parameter and the optimum reflector design value returned from the cooperation function unit 140 for the wireless device 40 and the control device 50 (reflector), respectively (S121 to S122). Note that, at this time, in a case where the optimum design value for controlling the position of the movable base station is also returned from the cooperation function unit 140, the another system 30 also sets the design value for the control device 50 (movable base station).

As described above, in response to the periodic optimum control request, the communication control system 10 in the present example predicts or estimates the future wireless quality on the basis of various types of information acquired from the wireless device 40, the control device 50, and the environment information acquisition device/DB 60, and then calculates the optimum wireless parameter and design value so that the future wireless quality satisfies the predetermined standard. As a result, it is possible to continue to configure the wireless communication network to always satisfy wireless communication necessary for the user terminal.

Operation Example in Example 2

Figure 3:
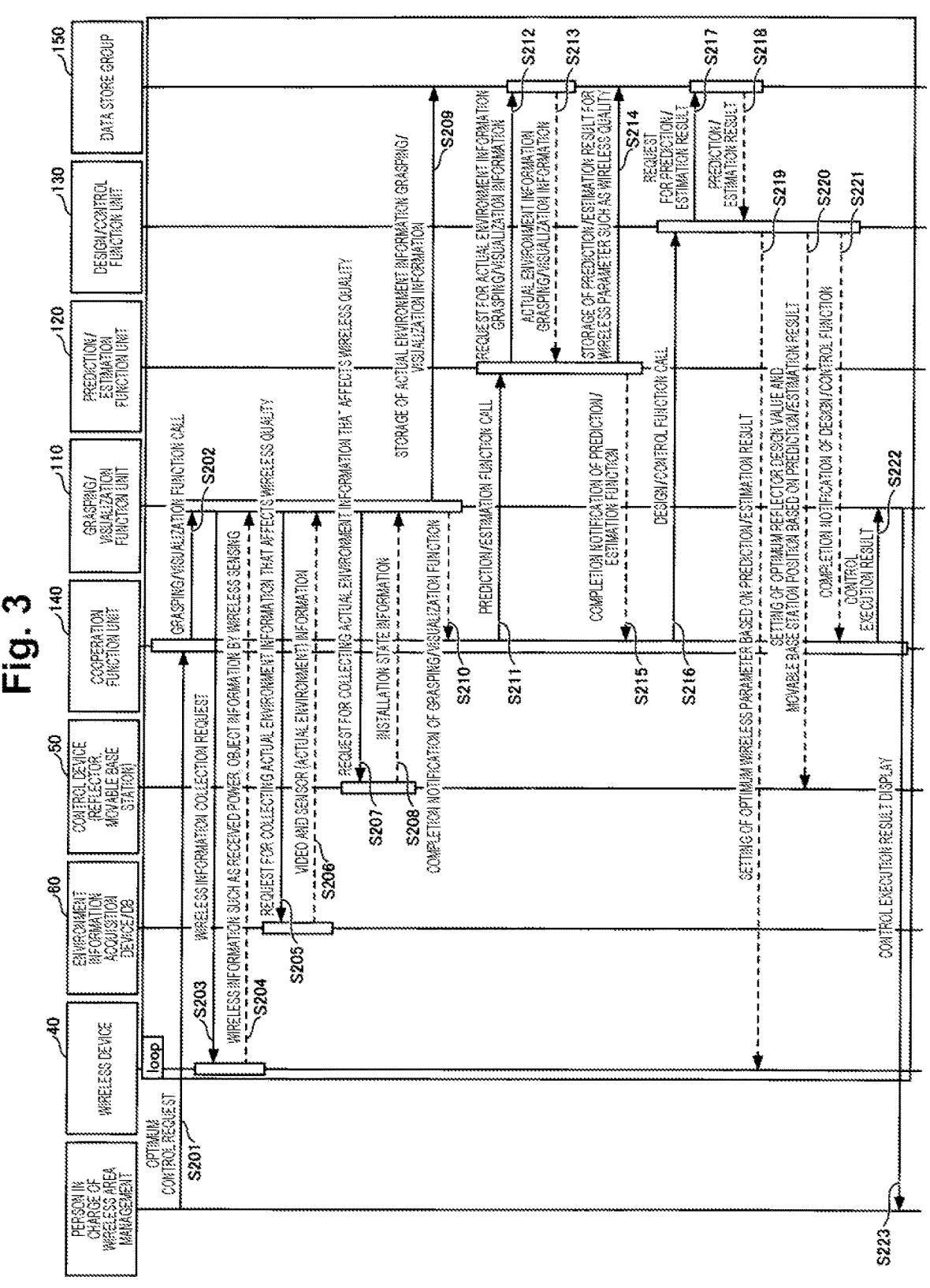
FIG. 3 is a sequence diagram for explaining an operation example in Example 2.

Next, an operation example of the communication control system 10 in the present example will be described with reference to a sequence diagram of FIG. 3. In the present example, a case will be described where the communication control system 10 continuously controls the wireless area quality in response to a request from a wireless area management terminal, for the optimum control of the wireless area quality. Note that, in the following, similarly to Example 1, it is assumed that the wireless device 40, the control device 50, and the environment information acquisition device/DB 60 are devices related to a wireless area as a target of the optimum control.

The cooperation function unit 140 receives an optimum control request from a person in charge of wireless area management (more precisely, a PC or the like used by the person in charge of wireless area management) (S201). When the optimum control request is received, the communication control system 10 periodically and repeatedly executes S202 to S221.

Since S202 to S218 are similar to S102 to S118 of Example 1, the description thereof will be omitted. Subsequent to S218, the design/control function unit 130 calculates an optimum wireless parameter and an optimum reflector design value on the basis of the acquired prediction/estimation result, and then sets the optimum wireless parameter in the wireless device 40 and sets the optimum reflector design value for the control device 50 (reflector) (S219 to S220). Note that, at this time, in a case where an optimum design value for controlling the position of the movable base station is also calculated, the design/control function unit 130 also sets the design value for the control device 50 (movable base station).

Then, the design/control function unit 130 transmits a completion notification to the cooperation function unit 140 (S221). The cooperation function unit 140 transmits a control execution result to the grasping/visualization function unit 110 (S222). The control execution result includes, for example, information indicating that the control is normally completed. The grasping/visualization function unit 110 displays the control execution result to the person in charge of wireless area management (S223).

As described above, once receiving the optimum control request, the communication control system 10 in the present example predicts or estimates the future wireless quality on the basis of various types of information acquired from the wireless device 40, the control device 50, and the environment information acquisition device/DB 60, and then continuously repeats calculating the optimum wireless parameter and design value so that the future wireless quality satisfies the predetermined standard. As a result, similarly to Example 1, it is possible to continue to configure the wireless communication network to always satisfy the wireless communication necessary for the user terminal.

Operation Example in Example 3

Figure 4:
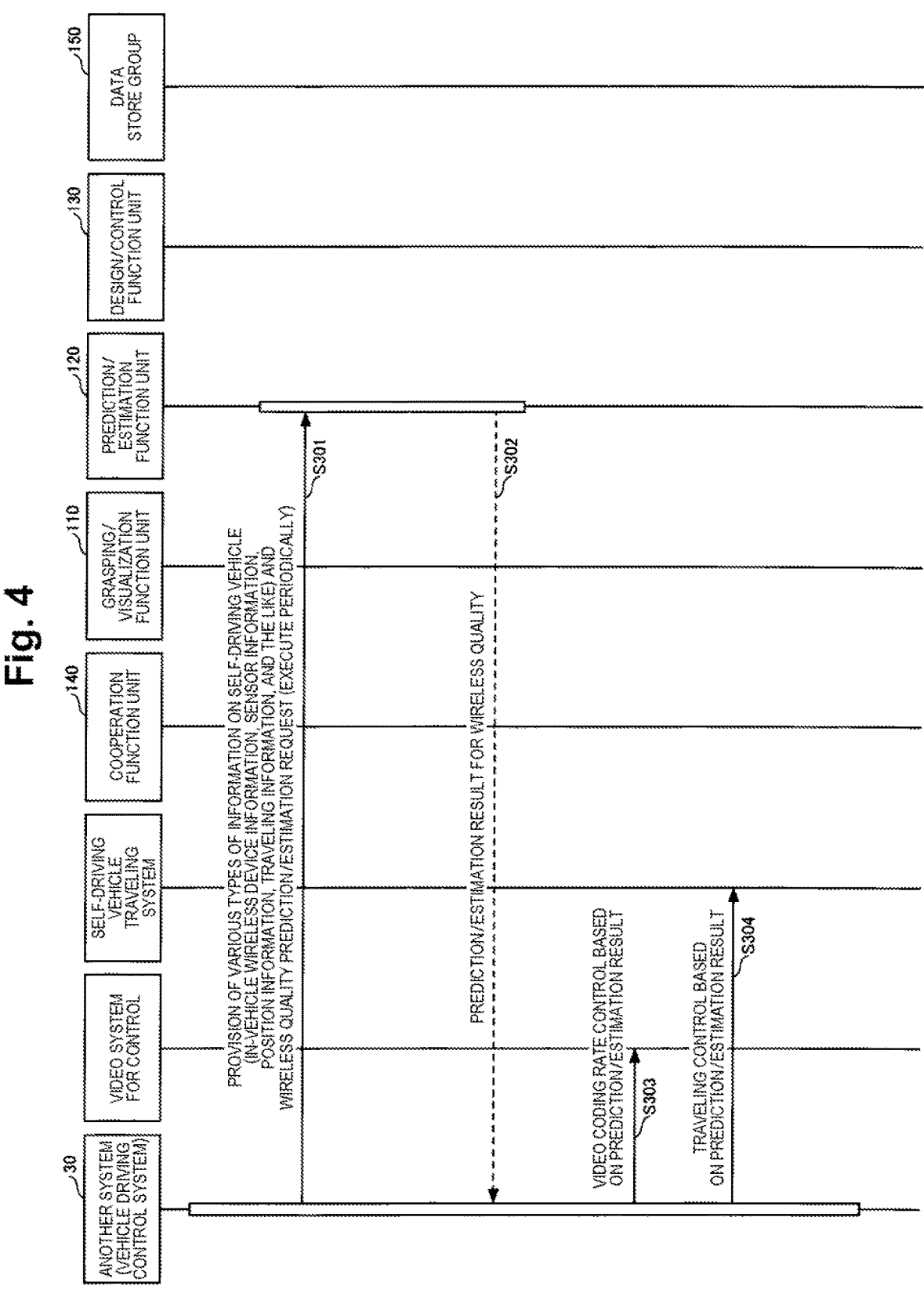
FIG. 4 is a sequence diagram for explaining an operation example in Example 3.

Next, an operation example of the communication control system 10 in the present example will be described with reference to a sequence diagram of FIG. 4. In the present example, a case will be described where wireless quality necessary for optimum control of a self-driving vehicle is predicted or estimated, and control related to automatic driving is implemented by a result of the prediction or estimation.

The prediction/estimation function unit 120 receives various types of information on the self-driving vehicle (for example, in-vehicle wireless device information, sensor information, position information, traveling information, and the like) and a wireless communication quality prediction/estimation request from the another system 30 (for example, a self-driving vehicle control system) (S301). Here, the self-driving vehicle control system is a system that controls the entire self-driving vehicle. In addition, the various types of information on the self-driving vehicle are information obtained from the wireless device 40 and the environment information acquisition device/DB 60 mounted on the self-driving vehicle. For example, the in-vehicle wireless device information is information such as received power or the like of the wireless device mounted on the self-driving vehicle, the sensor information is information obtained by sensing an environment around the self-driving vehicle, the position information is information indicating a traveling position of the self-driving vehicle and three-dimensional map information near the traveling position, and the traveling information is information such as a speed of the self-driving vehicle. Note that the various types of information and the wireless communication quality prediction/estimation request are periodically transmitted from the another system 30. In addition, transmission of the various types of information and the wireless communication quality prediction/estimation request are performed by calling an individual function unit (prediction/estimation function unit 120) by using the API of the communication control system 10.

The prediction/estimation function unit 120 predicts or estimates the future wireless quality on the basis of the above-described various types of information on the self-driving vehicle, and returns a result (prediction/estimation result) to the another system 30 (S302). As a result, the another system 30 can perform video coding rate control based on the prediction/estimation result for the video system for control, and can perform traveling control based on the prediction/estimation result for the self-driving vehicle traveling system (S303 to S304). Here, the video system for control is a system for coding a video for controlling the self-driving vehicle, and the self-driving vehicle traveling system is a system for controlling traveling of the self-driving vehicle. Not that an example of the video coding rate control based on the prediction/estimation result may include performing control such that a coding rate is lowered in a case where the wireless quality is lower than the predetermined standard (that is, in a case where the wireless quality is poor), and the coding rate is not changed in a case where the wireless quality is not lower than the predetermined standard (alternatively, the coding rate is increased). In addition, an example of the traveling control based on the prediction/estimation result may include performing control such that a traveling speed is reduced or a traveling route is changed in a case where the wireless quality is lower than the predetermined standard, and the traveling speed and the traveling route are not changed in a case where the wireless quality is not lower than the predetermined standard.

As described above, the communication control system 10 in the present example returns a prediction/estimation result for the future wireless quality to the another system 30 in response to periodic information provision and prediction/estimation request from the another system 30 (self-driving vehicle control system). As a result, it is possible to control video coding rate change for self-driving vehicle control, change of a traveling state, and the like on the basis of the prediction/estimation result, and as a result, it is possible to continue the automatic driving according to the quality of wireless communication.

Operation Example in Example 4

Figure 5:
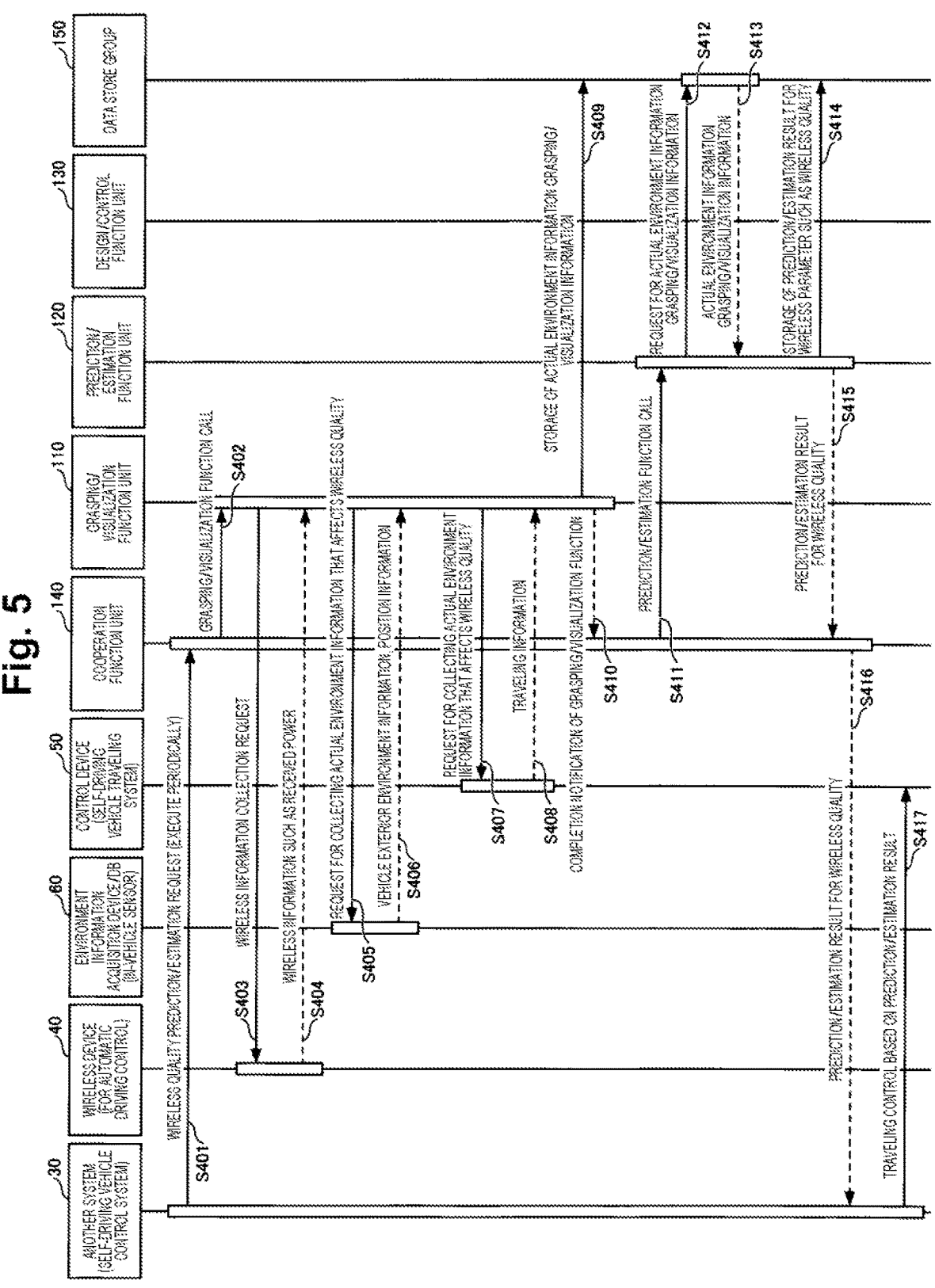
FIG. 5 is a sequence diagram for explaining an operation example in Example 4.

Next, an operation example of the communication control system 10 in the present example will be described with reference to a sequence diagram of FIG. 5. In the present example, a case will be described where the grasping/visualization function unit 110 acquires various types of information on the self-driving vehicle when the wireless quality necessary for optimum control of the self-driving vehicle is predicted or estimated. That is, in Example 3, various types of information on the self-driving vehicle are provided from the another system 30, but Example 4 is an example in a case where these various types of information are acquired by the grasping/visualization function unit 110.

The cooperation function unit 140 receives a wireless quality prediction/estimation request from the another system 30 (for example, a self-driving vehicle control system) (S401). Note that the wireless quality prediction/estimation request is periodically transmitted from the another system 30. In addition, the wireless quality prediction/estimation request is performed by using the API of the communication control system 10, whereby a scenario is called in which the wireless quality necessary for optimum control of the self-driving vehicle is predicted or estimated, and thereafter, the cooperation function unit 140 calls each function unit on the basis of the scenario.

The cooperation function unit 140 calls the grasping/visualization function unit 110 (S402). The grasping/visualization function unit 110 transmits a wireless information collection request to the wireless device 40 (for example, a wireless device for automatic driving control or the like) (S403). Then, the grasping/visualization function unit 110 acquires, as a response, wireless information such as received power of the wireless device 40 (S404).

Next, the grasping/visualization function unit 110 transmits a request for collecting actual environment information that affects the wireless quality to the environment information acquisition device/DB 60 (for example, an in-vehicle sensor, a map information DB, or the like) (S405). Note that the map information DB may be a DB provided in the vehicle or may be a DB provided outside (cloud or the like). Then, the grasping/visualization function unit 110 acquires, as a response, vehicle exterior environment information that is information regarding the environment around the self-driving vehicle and position information of the self-driving vehicle (S406).

Next, the grasping/visualization function unit 110 transmits a request for collecting actual environment information that affects the wireless quality to the control device 50 (for example, a self-driving vehicle traveling system or the like) (S407). Then, the grasping/visualization function unit 110 acquires, as a response, traveling information (S408).

Next, the grasping/visualization function unit 110 stores the information (Hereinafter, it is referred to as "actual environment information grasping/visualization information".) acquired in the above-described S404, S406, and S408 in the data store group 150, and transmits a completion notification to the cooperation function unit 140 (S409 to S410).

Subsequently, the cooperation function unit 140 calls the prediction/estimation function unit 120 (S411). The prediction/estimation function unit 120 transmits a request for the actual environment information grasping/visualization information to the data store group 150 (S412). Then, the prediction/estimation function unit 120 acquires, as a response, the actual environment information grasping/visualization information (S413). Note that, regarding the actual environment information grasping/visualization information, not only the information stored in the above-described S409, but also the actual environment information grasping/visualization information in the past necessary for prediction or estimation of the wireless quality may be acquired.

Then, the prediction/estimation function unit 120 predicts or estimates a wireless parameter indicating future wireless quality or the like on the basis of the actual environment information grasping/visualization information acquired in the above-described S413, stores a result (Hereinafter, it is referred to as a "prediction/estimation result".) in the data store group 150, and returns the result to the another system 30 via the cooperation function unit 140 (S414 to S416). Note that the prediction or estimation of the wireless parameter is implemented by any predetermined method. For example, the wireless parameter only needs to be predicted or estimated by a machine learning model trained by a predetermined machine learning method.

As a result, the another system 30 can perform traveling control based on the prediction/estimation result for the self-driving vehicle traveling system (S417).

As described above, in response to the periodic prediction/estimation request from the another system 30 (self-driving vehicle control system), the communication control system 10 in the present example predicts or estimates the future wireless quality on the basis of various types of information acquired from the wireless device for automatic driving control, the in-vehicle sensor, and the self-driving vehicle traveling system, and returns the prediction/estimation result to the another system 30. As a result, similarly to Example 3, it is possible to control the change of the traveling state of the self-driving vehicle and the like on the basis of the prediction/estimation result, and as a result, it is possible to continue the automatic driving according to the quality of wireless communication.

Hardware Configuration Example

The communication control system 10 according to the present embodiment can be implemented, for example, by causing a computer that implements each of the physical servers 11 to 17 to execute a program describing processing contents described in the present embodiment.

The program can be recorded in a computer-readable recording medium (portable memory, or the like), and be stored or distributed. In addition, the program can also be provided through a network such as the Internet or an electronic mail.

Figure 6:
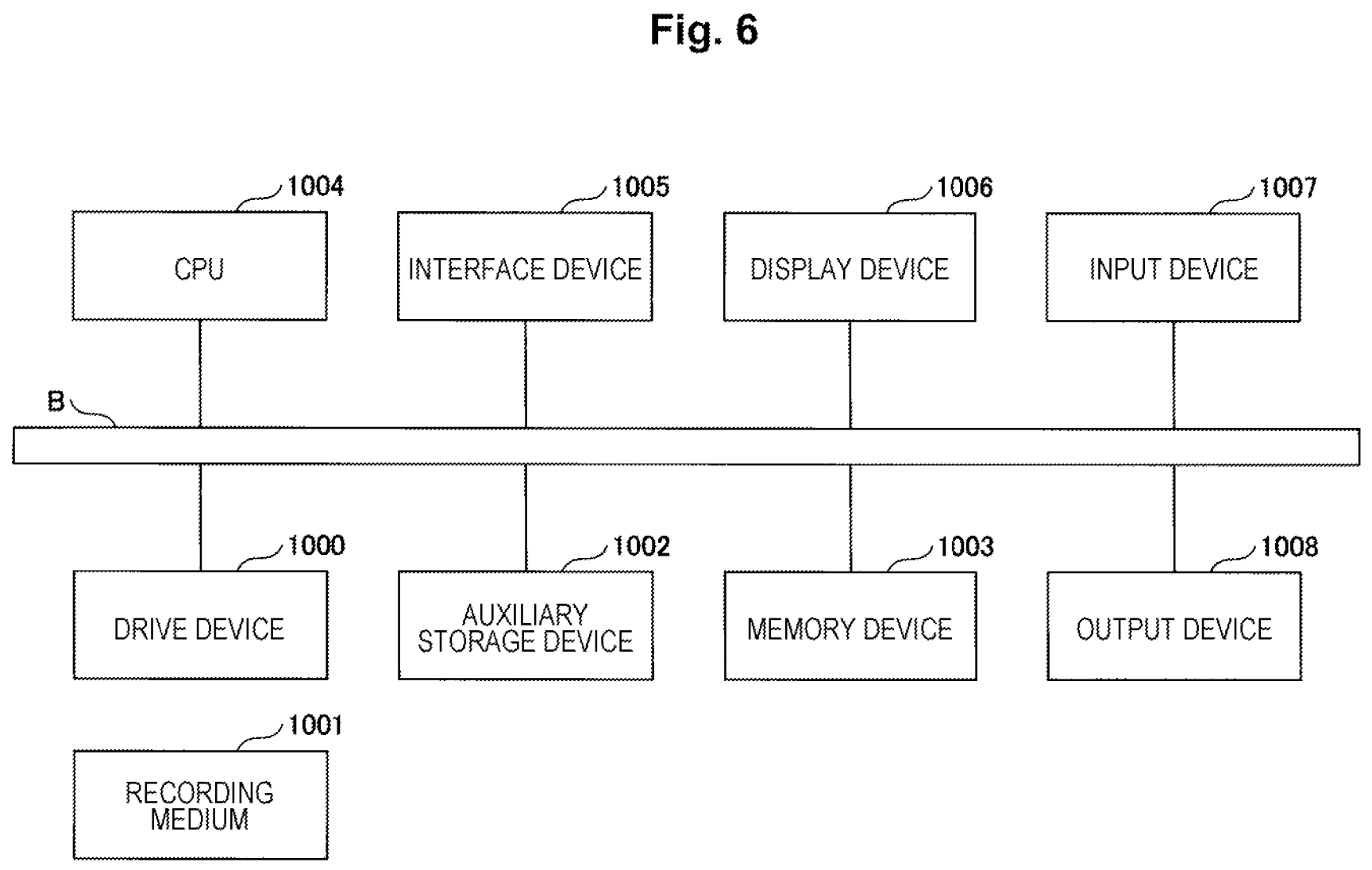

FIG. 6 is a diagram illustrating a hardware configuration example of the computer. The computer in FIG. 6 includes a drive device 1000, an auxiliary storage device 1002, a memory device 1003, a CPU 1004, an interface device 1005, a display device 1006, an input device 1007, an output device 1008, and the like, which are connected to one another by a bus B.

The program for implementing the processing in the computer is provided by, for example, a recording medium 1001 such as a CD-ROM or a memory card. When the recording medium 1001 storing the program is set in the drive device 1000, the program is installed from the recording medium 1001 to the auxiliary storage device 1002 via the drive device 1000. However, the program does not necessarily have to be installed from the recording medium 1001, and may be downloaded from another computer via a network. The auxiliary storage device 1002 stores the installed program and also stores necessary files, data, and the like.

In a case where an instruction to start the program is made, the memory device 1003 reads and stores the program from the auxiliary storage device 1002. The CPU 1004 implements functions related to the units described in the present embodiment in accordance with the program stored in the memory device 1003. The interface device 1005 is used as an interface for connecting to a network. The display device 1006 displays a GUI or the like by the program. The input device 1007 includes a keyboard and a mouse, buttons, a touch panel, or the like, and is used to input various operation instructions. The output device 1008 outputs a computation result. Note that the communication control system 10 may not include either or both of the display device 1006 and the input device 1007.

Effect of Embodiment

According to the technology according to the present embodiment, it is possible to dynamically control the quality of wireless communication depending on the user's purpose of use.

13

Summary of Embodiment

In the present specification, at least a communication control system, a communication control method, and a program in the following clauses are disclosed.

Clause 1

A communication control system including a plurality of physical servers, in which
  any physical servers from among the plurality of physical servers
  each include any one or more of:
  a plurality of acquisition units that acquires information regarding a wireless communication device and environment information that affects wireless communication quality;
  a plurality of prediction units that predicts future wireless communication quality on the basis of the information regarding the wireless communication device and the environment information;
  a plurality of control units that controls, on the basis of the future wireless communication quality, a target device to achieve wireless communication quality depending on a user's purpose, the user using wireless communication; and
  a cooperation unit that executes a combination of at least one or more of acquisition of information by the acquisition unit, prediction by the prediction unit, or control by the control unit in response to a request from another system connected via a network.

Clause 2

The communication control system according to clause 1, in which which physical server includes each of the acquisition units, the prediction units, the control units, and the cooperation unit is controlled depending on a network situation between the physical servers.

Clause 3

The communication control system according to clause 1 or 2, in which
  the target device includes at least one of a base station or a terminal, and
  the control unit controls a wireless parameter of at least one of the base station or the terminal.

Clause 4

The communication control system according to any one of clauses 1 to 3, in which
  the target device includes a reflector, and
  the control unit controls at least one of a radio wave reflection direction or radio wave reflection power of the reflector.

Clause 5

The communication control system according to any one of clauses 1 to 4, in which
  the target device includes a movable base station, and
  the control unit controls a position of the movable base station.

Clause 6

The communication control system according to any one of claims 1 to 5, in which the environment information includes at least one of video information captured by a camera, sensor information sensed by a sensor, or map information acquired from a map information DB.

Clause 7

The communication control system according to any one of clauses 1 to 6, in which the information regarding the wireless communication device includes received power information on the wireless communication device and object information obtained by detecting an object around the wireless communication device by wireless sensing.

Clause 8

A communication control method used for a communication control system including a plurality of physical servers, in which
  any physical servers from among the plurality of physical servers each execute any one or more procedures of:
  an acquisition procedure of acquiring information regarding a wireless communication device and environment information that affects wireless communication quality;
  a prediction procedure of predicting future wireless communication quality on the basis of the information regarding the wireless communication device and the environment information;
  a control procedure of controlling, on the basis of the future wireless communication quality, a target device to achieve wireless communication quality depending on a user's purpose, the user using wireless communication; and
  a cooperation procedure of executing a combination of at least one or more of acquisition of information by the acquisition procedure, prediction by the prediction procedure, or control by the control procedure in response to a request from another system connected via a network.

Clause 9

A program causing a computer to function as the communication control system according to any one of claims 1 to 7.

The present embodiment has been described above; however, the present invention is not limited to such a specific embodiment, and various modifications and changes can be made within the scope of the gist of the present invention described in the claims.

REFERENCE SIGNS LIST

10 communication control system
11 to 17 physical server
20 display unit
30 another system
40 wireless device
50 control device
60 environment information acquisition device/DB
110 grasping/visualization function unit
111 first grasping/visualization function unit
112 second grasping/visualization function unit
120 prediction/estimation function unit
121 first prediction/estimation function unit
122 second prediction/estimation function unit
130 design/control function unit 131 first design/control function unit
132 second design/control function unit
140 cooperation function unit
150 data store group
1000 drive device
1001 recording medium
1002 auxiliary storage device
1003 memory device
1004 CPU
1005 interface device
1006 Display device
1007 input device
1008 output device

The invention claimed is:

1. A communication control system comprising a plurality of physical servers, any one or more physical servers from among the plurality of physical servers each including a processor; and a memory storing instructions that cause the processor to execute one or more steps of:

acquiring information regarding a wireless communication device and environment information that affects wireless communication quality;

predicting future wireless communication quality on a basis of the information regarding the wireless communication device and the environment information;

controlling, on a basis of the future wireless communication quality, a target device to achieve wireless communication quality depending on a user's purpose, the user using wireless communication; and executing a combination of at least one or more steps of the acquiring, the predicting, or the controlling in response to a request from another system connected via a network, wherein which physical server causes the processor to execute each of the acquiring, the predicting, the controlling, and the executing is controlled depending on a network situation between the physical servers.

2. The communication control system according to claim 1, wherein the target device includes at least one of a base station or a terminal, and the controlling includes controlling a wireless parameter of at least one of the base station or the terminal.

3. The communication control system according to claim 1, wherein the target device includes a reflector, and the controlling includes controlling at least one of a radio wave reflection direction or radio wave reflection power of the reflector.

4. The communication control system according to claim 1, wherein the target device includes a movable base station, and the controlling includes controlling a position of the movable base station.

5. The communication control system according to claim 1, wherein the environment information includes at least one of video information captured by a camera, sensor information sensed by a sensor, or map information acquired from a map information DB.

6. The communication control system according to claim 1, wherein the information regarding the wireless communication device includes received power information on the wireless communication device and object information obtained by detecting an object around the wireless communication device by wireless sensing.

7. The communication control system according to claim 1, wherein the executing includes:

grasping the network situation including a network state, communication delay between the physical servers, and processing capability of each physical server, and dynamically controlling, based on the network situation, which of the plurality of physical servers executes each of the acquiring, the predicting, the controlling, and the executing.

8. The communication control system according to claim 1, wherein the executing includes:

collecting information regarding the network situation including communication delay between the physical servers and processing capability of each physical server, determining whether the communication delay exceeds a threshold or the processing capability falls below a threshold, and in response to determining that the communication delay exceeds the threshold or the processing capability falls below the threshold, dynamically controlling which of the plurality of physical servers executes each of the acquiring, the predicting, the controlling, and the executing.

9. The communication control system according to claim 1, wherein the predicting includes:

predicting a propagation situation of a radio wave by a ray tracing method using high-definition three-dimensional map information expressing a shape of a structure and a type of a tree, and predicting a wireless parameter indicating future wireless quality on the basis of the propagation situation of the radio wave.

10. A communication control method used for a communication control system, the communication control system including a plurality of physical servers, any one or more physical servers from among the plurality of physical servers each including a memory, and a processor configured to execute the communication control method, the communication control method comprising one or more steps of:

acquiring information regarding a wireless communication device and environment information that affects wireless communication quality;

predicting future wireless communication quality on a basis of the information regarding the wireless communication device and the environment information;

controlling, on a basis of the future wireless communication quality, a target device to achieve wireless communication quality depending on a user's purpose, the user using wireless communication; and executing a combination of at least one or more steps of the acquiring, the predicting, or the controlling in response to a request from another system connected via a network, wherein which physical server causes the processor to execute each of the acquiring, the predicting, the controlling, and the executing is controlled depending on a network situation between the physical servers.

11. A non-transitory computer-readable recording medium having computer-readable instructions stored thereon, which when executed, cause a computer to perform the communication control method according to claim 10.

* * * * *